US006414756B1

(12) United States Patent
Tsukada

(10) Patent No.: US 6,414,756 B1
(45) Date of Patent: Jul. 2, 2002

(54) SYSTEM AND METHOD OF REALIZING COLOR REPRODUCTION OF A COLOR IMAGE BETWEEN DIFFERENT COLOR DEVICES

(75) Inventor: Masato Tsukada, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/022,267

(22) Filed: Feb. 11, 1998

(30) Foreign Application Priority Data

Feb. 14, 1997 (JP) ............................................. 9-047334

(51) Int. Cl.⁷ ......................... G06F 15/00; H04N 1/46; G03F 3/08
(52) U.S. Cl. ......................... 358/1.9; 358/516; 358/520
(58) Field of Search ........................ 358/1.9, 1.1, 1.13, 358/1.15, 518, 520, 523, 515, 516; 382/167, 165, 162

(56) References Cited

FOREIGN PATENT DOCUMENTS

| JP | 4-172246 | 6/1992 |
| JP | 4-186969 | 7/1992 |
| JP | 4-275770 | 10/1992 |
| JP | 6-79088 | 3/1994 |
| JP | 6-296284 | 10/1994 |
| JP | 7-56549 | 3/1995 |

OTHER PUBLICATIONS

R.W.G. Hunt, "Revised Colour–Appearance Model for Related and Urelated Colours", Color Research and Application, vol. 16, No. 3, Jun. 1991, pp. 146–165.

"ICC Profile Format Specification", International Color Consortium, Ver. 3.2, Nov. 20, 1995, pp. ii–vii and 1–33.
"JIS Handbook Color", Japan Industrial Standards Association, 1988, pp. 247–249.
J. Tajima, "Color Image Reproduction Theory", Maruzen K.K., 1996, pp. 37–39.
J. Cohen, "Dependency of the Spectral Reflectance Curves of the Munsell Color Chips", Phychonomical Science, vol. 1, 1964, pp. 369–370.
Y. Nayatani, et al., "Color–Appearance Model and Chromatic–Adaptation Transform", Color Research and Application, vol. 15, No. 4, Aug. 1990, pp. 210–221.

Primary Examiner—Madeline Ann Vinh Nguyen
(74) Attorney, Agent, or Firm—Dickstein, Shapiro, Morin & Oshinsky, LLP

(57) ABSTRACT

A spectral power distribution of an original reference white which is a reference white of an original color space is restored from a color temperature of the original reference white or from a correlated color temperature obtained from the chromaticity of the original reference white when the color temperature is unknown and a spectral power distribution of an aimed reference white which is a reference white of an aimed color space from a color temperature of the aimed reference white or a correlated color temperature obtained from chromaticity of the aimed reference white when the color temperature is unknown. A surface reflectance of an arbitrary color in the original color space is restored by using tristimulus values of the arbitrary color, the spectral power distribution of the original reference white and human color matching function to obtain tristimulus values of a color in the aimed color space. With this, it is possible to make colors in the color image devices having different color temperatures of the reference whites coincident without necessity of constraint of special observing condition influencing human color adaptation and with minimum amount of calculation.

12 Claims, 11 Drawing Sheets

SYSTEM AND METHOD OF REALIZING COLOR REPRODUCTION OF A COLOR IMAGE BETWEEN DIFFERENT COLOR DEVICES

BACKGROUND OF THE INVENTION

The present invention claims priority from Japanese Patent Application No. 9-047334 filed Feb. 14, 1997, the content of this being incorporated herein by reference.

1. Field of the Invention

The present invention relates to a color conversion processing in a color management system for realizing a color reproduction of a color image between different color devices such as color scanner, color CRT monitor and color printer, etc., and, particularly, a color conversion technique to be used in converting an arbitrary color in an original color space into a color in an objective color space while making a visual color in one colormetric having a reference white coincident with a visual color in another colormetric having a reference white different from the reference white of the one colormetric.

2. Description of Related Art

In order to realize a color reproduction of a color image between different color image devices such as color scanner, CRT monitor and printer, etc., it is necessary to know color characteristics of the respective color image devices and to use a color conversion utilizing the same color characteristics. In a color reproduction method which is used currently, a color conversion processing is performed by measuring color characteristics of respective color image devices by utilizing a spectrophotometer, etc., and making the measured data coincident in a XYZ colormetric stipulated by CIE (Comission Internationale de 1Eclairage) or a uniform color space L* a* b*.

A case where a color image displayed on a CRT monitor is output by a printer will be described.

In a CRT monitor, the color reproduction using the additive color mixture of three primary color lights of red (R), green (G) and blue (B) is performed. Since the linearity is established in the additive color mixture, the color characteristics of the CRT, that is, the color gamut thereof, is obtained if tristimulus values (XYZ values) of the RGB fluorescent materials and tristimulus values of reference white set in the CRT monitor are obtainable by measurements.

On the other hand, in a printer, it is impossible to obtain the color gamut by a simple method since a complicated color reproduction such as subtractive mixture of colors using a plurality of color inks or parallel mixture of colors, etc., is performed. Currently, the color gamut of the printer is obtained by producing a plurality of color patches controlled by color inks and obtaining XYZ (or L*a*b*) values by measuring colors of the color patches one by one by means of a spectrophotometer. Illumination used in this measurement is set to D50.

Here, the reference white set in each color image device should be considered. When color temperature of reference white set in a CRT monitor is 5000K which is substantially the same as that of a illumination light source used in the printer, XYZ value representing the color gamuts of the CRT and the printer can be utilized as the same color space and, therefore, it is possible to compare the color gamut in XYZ colormetric of the CRT monitor with the color gamut of the XYZ colormetric of the printer directly. That is, for an arbitrary color (Xd, Yd, Zd) on the CRT monitor which exists in the color gamut of the printer, it is possible to make an output color of the CRT monitor coincident with an output color of the printer by merely searching a set of amounts of color inks reproducing the color (Xd, Yd, Zd) without processing the tristimulus value.

In general, however, color temperature of the reference white set in the CRT monitor is very high, that is, as high as, for example, 9300K. When human who is familiar with the white color of D50 looks white set to 9300K, he feels it bluish. Therefore, in order to realize color reproduction between different color image devices having different color temperatures of reference white, the difference in white color must be absorbed.

The conventional color conversion between different reference whites will be described by taking a case of conversion from an arbitrary color $(X_A, Y_A, Z_A)$ in a color space of a device A having XYZ value $(X_{WA}, Y_{WA}, Z_{WA})$ of reference white into a color $(X_B, Y_B, Z_B)$ in a color space of a device B having XYZ values $(X_{WB}, Y_{WB}, Z_{WB})$ of the reference white as an example.

The color $(X_B, Y_B, Z_B)$ of the device B corresponding to the color $(X_A, Y_A, Z_A)$ of the device A is calculated by utilizing a ratio of the XYZ values of the reference whites in the devices A and B according to the following equations:

$$X_B = X_A \times (X_{WB} \div X_{WA}) \qquad (1)$$

$$Y_B = Y_A \times (Y_{WB} \div Y_{WA}) \qquad (2)$$

$$Z_B = Z_A \times (Z_{WB} \div Z_{WA}) \qquad (3)$$

The color conversion method using the ratios of XYZ values of reference whites is simple and can realize a high speed color conversion.

However, in the case where the color temperatures of reference whites of color image devices such as the CRT monitor and the printer are substantially different, human chromatic adaptation in different viewing environments is complicated. Therefore, colors reproduced according to the conventional color converting technique in which the color conversion is performed by using the ratio calculation of the XYZ values of the reference whites of the color image devices appear substantially differently.

Other than the above mentioned technique, the color appearance model of Hunt has been known (cf. R. W. Hunt, "Revised Colour-Appearance Model for Related and Unrelated Colours", Color Research and Application, Vol. 16, No. 3, June 1991).

The color appearance model of Hunt controls the human chromatic adaptation by severely setting a color viewing condition and, therefore, it has been considered that it can realize a good color reproduction between color image devices having substantially different color temperatures of reference white. However, in the engineering view point, when this model is utilized, it is difficult to systemize the model due to problems that the monitoring condition for controlling human chromatic adaptation is too severe, that the calculation is so complicated and that the number of parameters necessary for color conversion is too many, etc.

SUMMARY OF THE INVENTION

An object of the present invention is to provide a color conversion method which makes a human color vision for a color reproduced by one color image device the same as that for the color reproduced by another color image device having a reference white which is different from that of the one color image device without necessity of constraint of special viewing condition which substantially influences the human chromatic adaptation while requiring minimum amount of calculation.

Another object of the present invention is to provide a color converter which makes a human color vision for a color reproduced by one color image device the same as that for the color reproduced by another color image device having a reference white which is different from that of the one color image device without necessity of constraint of special monitoring condition which substantially influences the human chromatic adaptation while requiring minimum amount of calculation.

In order to achieve the above objects, a color conversion method according to a first aspect of the present invention, which converts an arbitrary color in an original color space into a color in an aimed color space while maintaining these color appearances the same, comprises the steps of restoring a spectral power distribution of an original reference white of the original color space from a color temperature of the original reference white, restoring a spectral power distribution of an aimed reference white of the aimed color space from a color temperature of the aimed reference white, restoring a surface reflectance of the arbitrary color in the original color space by utilizing tristimulus values of the arbitrary color in the original color space, the spectral power distribution of the original reference white and a human color matching function, and obtaining tristimulus values of the color in the aimed color space from the restored surface reflectance, the restored spectral power distribution of the aimed reference white and the human color matching function.

Further, according to a second aspect of the present invention, in order to make possible to perform a color conversion while making human color vision of an arbitrary color in an original color space the same as that of a color in an aimed color space when color temperatures of reference whites of the original color space and the aimed color space are unknown and chromaticity of the reference whites of the original color space and the aimed color space are known, a color conversion method for converting the arbitrary color in the original color space into the color in the aimed color space while maintaining these color appearances the same, comprises the steps of obtaining a correlated color temperature of the original reference white of the original color space from chromaticity of the original color space, restoring a spectral power distribution of the original reference white from the thus obtained correlated color temperature, obtaining a correlated color temperature of the aimed reference white of the aimed color space from the chromaticity of the aimed reference white, restoring a spectral power distribution of the aimed reference white from the thus obtained correlated color temperature, restoring a surface reflectance of the arbitrary color in the original color space by utilizing tristimulus values of the arbitrary color, the spectral power distribution of the original reference white and a human color matching function, and obtaining tristimulus values of the color in the aimed color space from the restored surface reflectance, the restored spectral power distribution of the aimed reference white and the human color matching function.

A color converter according to a third aspect of the present invention which displays an arbitrary RGB data displayed on an original color image display performing a color reproduction by means of RGB lights on an aimed color image display performing a color reproduction by means of RGB lights while maintaining these color appearances the same, comprises spectral power distribution restoring means for restoring a spectral power distribution of a reference white of the original color image display from a color temperature of the reference white of the original color image display and restoring a spectral power distribution of a reference white of the aimed color image display from a color temperature of a reference white of the aimed color image display, spectral surface reflectance restoring means for restoring a surface reflectance in a scene of the arbitrary RGB value displayed on the original color image display on the basis of the restored spectral power distribution of the reference white of the original color image display, the RGB value and the human color matching function and RGB value calculation means for calculating RGB value in the aimed color image display from the surface reflectance restored by the spectral surface reflectance restoring means, the spectral power distribution of the reference white of the aimed color image display restored by the spectral power distribution restoring means and the human color matching function.

In this color converter, the spectral power distribution restoring means restores the spectral power distribution of the reference white of the original color image display from the color temperature of the reference white of the original color image display and restores the spectral power distribution of the reference white of the aimed color image display from the color temperature of the reference white of the aimed color image display, the spectral surface reflectance restoring means restores the surface reflectance in the scene of the RGB value on the basis of the spectral power distribution of the reference white of the original color image display restored by the spectral power distribution restoring means, the arbitrary RGB values displayed on the original color image display and the human color matching function and the RGB value calculation means calculates the RGB values in the aimed color image display from the surface reflectance restored by the spectral surface reflectance restoring means, the spectral power distribution of the reference white of the aimed color image display restored by the spectral power distribution restoring means and the human color matching function.

A color converter according to a fourth aspect of the present invention which displays an arbitrary RGB data displayed on an original color image display performing a color reproduction by means of RGB lights on an aimed color image display performing a color reproduction by means of RGB lights while maintaining these color appearances the same, comprises correlated color temperature calculation means for calculating a correlated color temperature of the reference white of the original color image display from chromaticity of the reference white of the original color image display and a correlated color temperature of the reference white of the aimed color image display from chromaticity of the reference white of the aimed color image display, spectral power distribution restoring means for restoring a spectral power distribution of the reference white of the original color image display from the correlated color temperature of the reference white of the original color image display calculated by the correlated color temperature calculation means and a spectral power distribution of the reference white of the aimed color image display from the correlated color temperature of the reference white of the aimed color image display calculated by the correlated color temperature calculation means, spectral surface reflectance restoring means for restoring a surface reflectance in a scene of the arbitrary RGB value displayed on the original color image display on the basis of the spectral power distribution of the reference white of the original color image display restored by the spectral power distribution restoring means, the RGB value displayed on the original color image display and the human color matching function and RGB value calculation means for calculating RGB value in the aimed color image display from the surface reflectance restored by the spectral surface reflectance restoring means, the spectral power distribution of the reference white of the aimed color image display restored by the spectral power distribution restoring means and the human color matching function.

In this color converter, the correlated color temperature calculation means calculates the correlated color temperature of the reference white of the original color image display from the chromaticity of the reference white of the original color image display and the correlated color temperature of the reference white of the aimed color image display from the chromaticity of the reference white of the aimed color image display, the spectral power distribution restoring means restores the spectral power distribution of the reference white of the original color image display from the correlated color temperature of the reference white of the original color image display calculated by the correlated color temperature calculation means and restores the spectral power distribution of the reference white of the aimed color image display from the correlated color temperature of the reference white of the aimed color image display calculated by the correlated color temperature calculation means.

BRIEF DESCRIPTION OF THE DRAWINGS

The above mentioned and other objects, features and advantages of the present invention will become more apparent by reference to the following detailed description of the present invention in conjunction with the accompanying drawings, wherein.

DETAILED DESCRIPTION OF PREFERRED EMBODIMENTS

First, a color conversion method of the present invention will be described.

Figure 1:
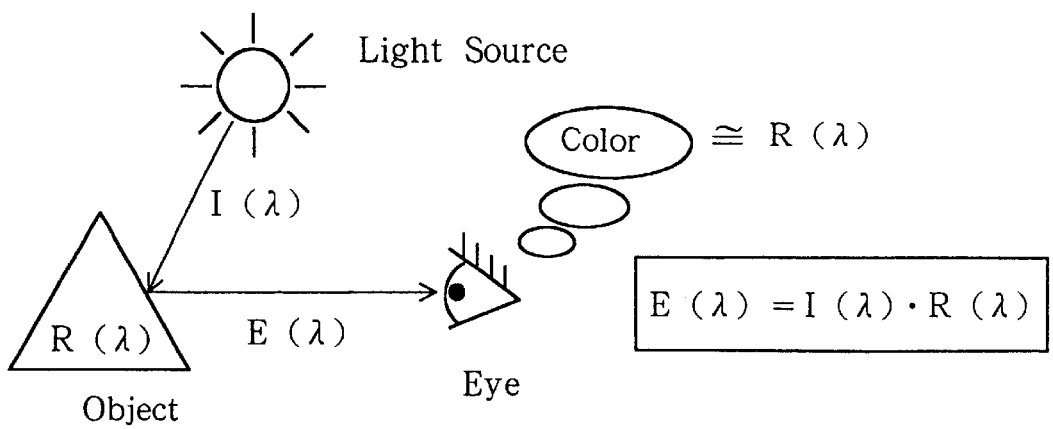
FIG. 1 illustrates a process of light incident on human eyes.

In general, human eyes can sense light having wavelength in a range from about 400 nm to 700 nm and different sensation colors are provided by difference in spectral components of light in this visible light range. The spectral components of light which becomes an incident light on human eyes, that is, spectrum $E(\lambda)$ is represented by a product of spectral power distribution $I(\lambda)$ radiated from a light source and a surface reflectance $R(\lambda)$ of an object as shown in FIG. 1. Therefore, even with the same object, the spectrum $E(\lambda)$ becomes different if the light source is different.

However, human eyes can sense an object as having substantially the same color under clear sky or under a fluorescent lamp having spectrum characteristics completely different from that of clear sky. The human visual function which can stably sense a color of an object under different illumination environments is called color constancy which means that human can unconsciously obtain some features representing a color characteristics inherent to an object which is not influenced by color characteristics of illumination.

The color conversion method of the present invention performs a color conversion in color spaces having different reference white colors by utilizing the fact that human has the visual function called color constancy. In concrete, a color vision of human eyes for a color in an original color space is made the same in another color space by restoring a surface reflectance $R(\lambda)$ representing a color of an object in the original color space into which the color conversion is performed and performing a color conversion by utilizing the restored surface reflectance $R(\lambda)$.

Now, an example of the concrete procedures of the color conversion method will be described by using a case where a color device forming the original color space is a CRT monitor having RGB fluorescent materials and a color device forming the aimed color space is a color printer as an example. Incidentally, a color temperature of a reference white in the CRT monitor and chromaticity of the R, G and B fluorescent materials are preliminarily given and a color temperature of a reference white (assuming D50) and a color gamut are preliminarily obtained by measurement. Considering a color conversion in a color management system for realizing a color reproduction between different color devices, a profile describing a color characteristics of a color device, such as ICC profile (cf. international Color Consortium: "ICC Profile Format Specification", Ver. 32, Nov. 20, 1995) can be generally utilized, the assumption that the color temperatures, etc., of the reference white of the color devices are known does not make any special problem.

Figure 2:
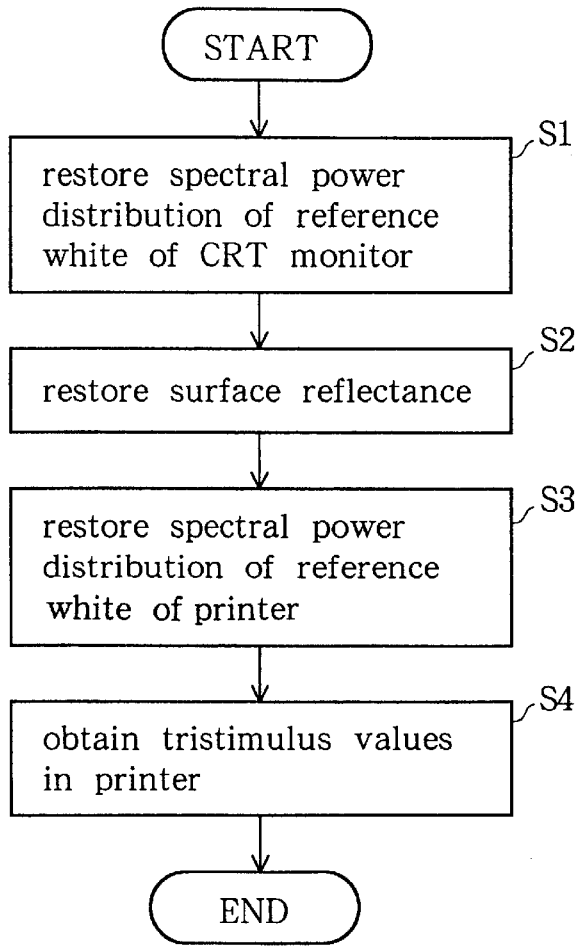
FIG. 2 is a flowchart showing an example of conversion steps of a color conversion method.

First, as shown in FIG. 2, a spectral power distribution of the reference white of the CRT monitor is restored on the basis of the color temperature of the reference white of the CRT monitor (S1). In this case, the restoration of the spectral power distribution of the reference white of the CRT monitor is performed for example as to be described.

The spectral power distribution at correlated color temperature TCP of CIE day-light can be obtained as follow (cf "JIS Handbook Color", Japan Industrial Standards Association, pp. 47–249, 1988): The term "correlated color temperature" is a representation of chromaticity of a sample radiation approximating chromaticity of perfect radiator and is represented by an absolute temperature of the perfect radiator having chromaticity closest to that of the sample radiation.

Chromaticity $(x_p, y_p)$ corresponding to CIE day-light of an arbitrary correlated color temperature TCP can be obtained by the following equations (4) to (6).

a) When $4000 \leq T_{CP} \leq 7000$, $$x_p = -4.4070(10^9 \div T_{CP^3}) + \quad (4)$$
$$2.9678(10^6 \div T_{CP^3}) +$$
$$0.09911(10^3 \div T_{CP}) +$$
$$0.244063$$

b) When $T_{CP} > 7000$, $$x_p = -2.0064(10^9 \div T_{CP^3}) + \quad (5)$$
$$1.9018(10^6 \div T_{CP^2}) +$$
$$0.24748(10^3 \div T_{CP}) +$$
$$0.237040$$

$$y_p = -3.000x_p^2 + 2.870x_p - 0.275 \quad (6)$$

Figure 3:
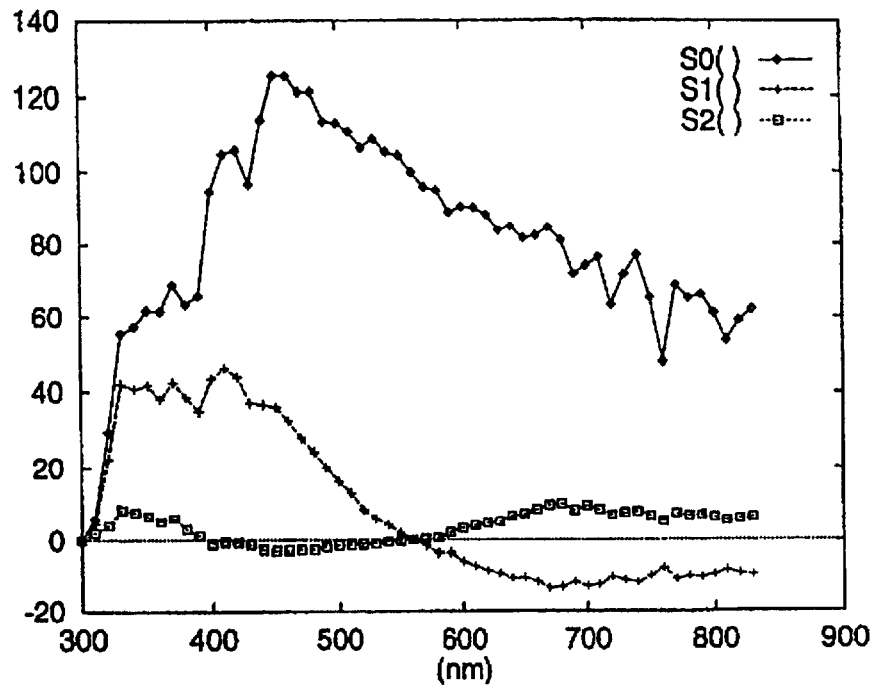
FIG. 3 is a graph showing three basis vectors of illumination.

Further, the spectral power distribution $S(\lambda)$ of CIE daylight can be obtained by the equations (7) to (9).

$$S(\lambda) = S_0(\lambda) + M_1 S_1(\lambda) + M_2 S_2(\lambda) \quad (7)$$

$$M_1 = (-1.3515 - 1.7703x_p + 5.9114y_p) \div \quad (8)$$
$$(0.0241 + 0.2562x_p - 0.7341y_p)$$

$$M_2 = (0.0300 - 31.4424x_p + 30.0717y_p) \div \quad (9)$$
$$(0.0241 + 0.2562x_p - 0.7341y_p)$$

where $S_0(\lambda)$, $S_1(\lambda)$ and $S_2(\lambda)$ are the basis vectors shown in FIG. 3.

Therefore, the spectral power distribution of the reference white of the CRT monitor can be restored in the following manner. First, the chromaticity $x_p$ of the reference white of the CRT monitor is obtained by substituting the color temperature of the reference white of the CRT monitor, which is given preliminarily, for $T_{CP}$ in the equation (4) or (5). Then, the chromaticity $y_p$ is obtained by substituting the chromaticity $x_p$ of the reference white of the CRT monitor for those in the equation (6). Thereafter, coefficients $M_1$ and $M_2$ of the equation (7) which represents the spectral power distribution by a linearly weighted sum of the basis vectors are obtained by substituting the chromaticity $(x_p, y_p)$ for $x_p$ and $y_p$ in the equations (8) and (9). Then, the spectral power distribution of the reference white of the CRT monitor is restored by substituting the coefficients $M_1$ and $M_2$ for the equation (7).

After the spectral power distribution of the reference white of the CRT monitor is restored in the step S1, the surface reflectance $R(\lambda)$ of the object displayed on the CRT monitor is restored (S2). The processing of the step S2 will be described in detail. XYZ values corresponding to the RGB values of the object in an image displayed on the CRT monitor are obtained by linear conversion utilizing a 3×3 conversion matrix. The XYZ values of the color $(R_a, G_a, B_a)$ of the object in the image displayed on the CRT monitor is shown by the following equation (10).

$$\begin{pmatrix} X \\ Y \\ Z \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} R_a \\ G_a \\ B_a \end{pmatrix} \quad (10)$$

The conversion matrix (3×3) of the equation (10) can be calculated from the chromaticities of the RGB fluorescent materials and the reference white of the CRT monitor (cf. Joji Tajima, "Color Image Reproduction Theory", Maruzen K. K., pp.27 to 39, 1996).

Since the CRT monitor is a device of self light emitting type, the XYZ values of the arbitrary object displayed on the CRT monitor, which are obtained by the equation (10), is a color which we recognize as the color of the object. Assuming that the maximum luminance which can be output by the CRT monitor is the perfect reflection object (perfect white), a color of an illumination light source in a scene on the CRT monitor is deemed as being coincident with the reference white of the CRT monitor, provided that the RGB values representing such state are $R_{max} = G_{max} = B_{max} = 255$. That is, this means that the scene is illuminated by the light source having the same spectral components as those of the reference white of the CRT monitor.

Figure 4:
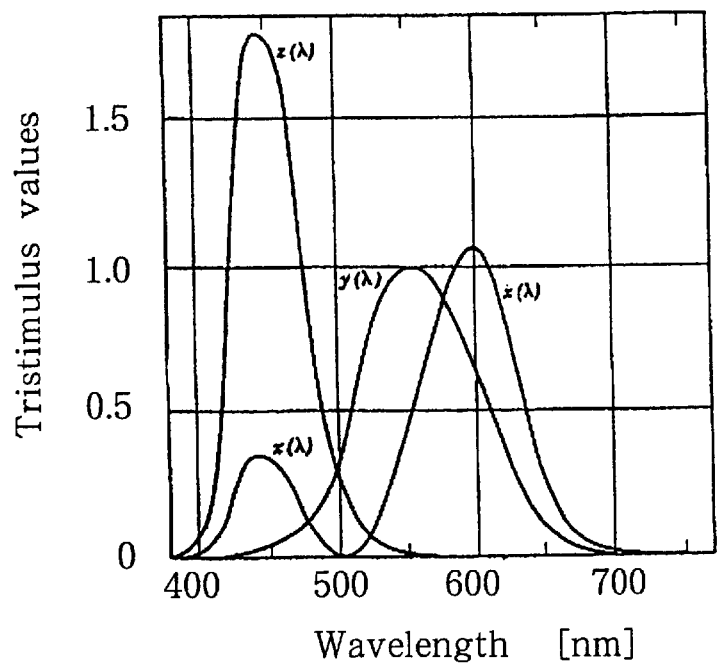
FIG. 4 is a graph showing a color matching function.

Using the surface reflectance $R(\lambda)$ of the object displayed on the CRT monitor and the XYZ values $(X_1, Y_1, Z_1)$ of the object which we sense on the CRT monitor, relations shown by the equations (11) to (13) are obtained.

$$X_1 = \int S_d(\lambda) R(\lambda) x(\lambda) d\lambda \quad (11)$$

$$Y_1 = \int S_d(\lambda) R(\lambda) y(\lambda) d\lambda \quad (12)$$

$$Z_1 = \int S_d(\lambda) R(\lambda) z(\lambda) d\lambda \quad (13)$$

where $S_d(\lambda)$ represents the spectral power distribution corresponding to the reference white of the CRT monitor, $x(\lambda)$, $y(\lambda)$ and $z(\lambda)$ are human color matching functions, all of which are known. The color matching functions are shown in FIG. 4. Since the left side $(X_1, Y_1, Z_1)$ of the equations (11) to (13) which are the tristimulus values are obtainableby the equation (10), the equations (11) to (13) become observation equations related to the surface reflectance $R(\lambda)$ of the object.

When the surface reflectance $R(\lambda)$ of an unknown object is solved by using the observation equations (11) to (13), a finite dimension linear model in which the surface reflectance$R(\lambda)$by a weighted sum of a finite number of basis vectors can be utilized (cf J. Cohen, "Dependency of the spectral reflectance curves of the Munsell color chips", Psychonomical Science, Vol. 1, pp. 369 to 370, 1964). This is based on an assumption that, since the surface reflectance of a material is generally smooth, it may be represented by a weighted sum of a small number of basis vectors, and the surface reflectance $R(\lambda)$ becomes as shown by the equation (14).

$$R(\lambda) = r_0(\lambda) + a_1 r_1(\lambda) + a_2 r_2(\lambda) + a_3 r_3(\lambda) \quad (14)$$

where $r_i(\lambda)[i=0\sim3]$ are basis vectors for representing the surface reflectance of a material, all of which are known. Further, $a_1$, $a_2$ and $a_3$ are coefficients of the respective basis vectors which become unknown characteristics parameters representing a color of the material.

The basis vectors representing the surface reflectance of the material can be utilized such that $r_0(\lambda)$ represents an average vector, $r_1(\lambda)$ represents a first principle component, $r_2(\lambda)$ represents a second principle component and $r_3(\lambda)$ represent a third principle component, the average value and the respective principle components being obtained by a principle component analysis of surface reflectances of a number of objects. Alternatively, Cosine curve and Sine curve, etc., can be utilized as the basis vectors.

By combining the observation equations (11) to (13) and the equation (14), a simultaneous linear equation (15) related to the unknown parameters $(a_1, a_2, a_3)$ is obtained.

$$\begin{pmatrix} X_1 - \int S_d(\lambda)x(\lambda)r_0(\lambda)d\lambda \\ Y_1 - \int S_d(\lambda)y(\lambda)r_0(\lambda)d\lambda \\ Z_1 - \int S_d(\lambda)z(\lambda)r_0(\lambda)d\lambda \end{pmatrix} = \tag{15}$$

$$\begin{pmatrix} \int S_d(\lambda)x(\lambda)r_1(\lambda)d\lambda & \int S_d(\lambda)x(\lambda)r_2(\lambda)d\lambda & \int S_d(\lambda)x(\lambda)r_3(\lambda)d\lambda \\ \int S_d(\lambda)y(\lambda)r_1(\lambda)d\lambda & \int S_d(\lambda)y(\lambda)r_2(\lambda)d\lambda & \int S_d(\lambda)y(\lambda)r_3(\lambda)d\lambda \\ \int S_d(\lambda)z(\lambda)r_1(\lambda)d\lambda & \int S_d(\lambda)z(\lambda)r_2(\lambda)d\lambda & \int S_d(\lambda)z(\lambda)r_3(\lambda)d\lambda \end{pmatrix} \begin{pmatrix} a_1 \\ a_2 \\ a_3 \end{pmatrix}$$

By using the unknown characteristics parameters ($a_1$, $a_2$, $a_3$) shown by the observation equation (15) in the equation (14), the surface reflectance $R(\lambda)$ of an object on the CRT monitor can be restored. When the surface reflectance $R(\lambda)$ of the object on the CRT monitor is restored, it is easy to calculate the XYZ values under an arbitrary illumination.

In the step S2, after the surface reflectance $R(\lambda)$ of the object on the CRT monitor is obtained, the spectral power distribution of the reference white of the printer is restored in the described manner (S3).

Thereafter, the XYZ values ($X_2$, $Y_2$, $Z_2$) of the object at D50 which is the reference white of the printer is restored (S4). The processing in the step S4 will be described in detail.

The XYZ values ($X_2$, $Y_2$, $Z_2$) of the object at D50 which is the reference white of the printer can be represented by the equations (16) to (18) by utilizing the restored surface reflectance $R(\lambda)$ of the object.

$$X_2 = \int S_{D50}(\lambda)R(\lambda)x(\lambda)d\lambda \tag{16}$$

$$Y_2 = \int S_{D50}(\lambda)R(\lambda)y(\lambda)d\lambda \tag{17}$$

$$Z_2 = \int S_{D50}(\lambda)R(\lambda)z(\lambda)d\lambda \tag{18}$$

$S_{D50}(\lambda)$ represents a spectral power distribution of D50 and is known. The equations (16) to (18) for calculating the XYZ values ($X_2$, $Y_2$, $Z_2$) of the object at D50 which is the reference white of the printer are rewritten to the following simple matrix equation (19) by combining the equation (14) and the equations (16) to (18).

$$\begin{pmatrix} X_2 \\ Y_2 \\ Z_2 \end{pmatrix} = \begin{pmatrix} \int S_D 50(\lambda)x(\lambda)r_0(\lambda)d\lambda \\ \int S_D 50(\lambda)y(\lambda)r_0(\lambda)d\lambda \\ \int S_D 50(\lambda)z(\lambda)r_0(\lambda)d\lambda \end{pmatrix} + \tag{19}$$

$$\begin{pmatrix} \int S_D 50(\lambda)x(\lambda)r_1(\lambda)d\lambda & \int S_D 50(\lambda)x(\lambda)r_2(\lambda)d\lambda & \int S_D 50(\lambda)x(\lambda)r_3(\lambda)d\lambda \\ \int S_D 50(\lambda)y(\lambda)r_1(\lambda)d\lambda & \int S_D 50(\lambda)y(\lambda)r_2(\lambda)d\lambda & \int S_D 50(\lambda)y(\lambda)r_3(\lambda)d\lambda \\ \int S_D 50(\lambda)z(\lambda)r_1(\lambda)d\lambda & \int S_D 50(\lambda)z(\lambda)r_2(\lambda)d\lambda & \int S_D 50(\lambda)z(\lambda)r_3(\lambda)d\lambda \end{pmatrix} \begin{pmatrix} a_1 \\ a_2 \\ a_3 \end{pmatrix}$$

since $S_{D50}$, $x(\lambda)$, $y(\lambda)$, $z(\lambda)$, $r_i(\lambda)$ (i=0 to 3) in the equation (19) are known, the integration terms of products of these functions can be calculated preliminarily. Therefore, by using the characteristics parameters ($a_1$, $a_2$, $a_3$) obtained by the observation equation (15) in the equation (19), it is possible to calculate the XYZ values ($X_2$, $Y_2$, $Z_2$) of the object at D50 which is the reference white of the printer at high speed.

Although, in the described embodiment, the spectral power distribution of the reference white of the CRT monitor is restored first (S1), the surface reflectance of the object on the CRT monitor is restored (S2), then the spectral power distribution of the reference white of the printer is restored (S3) and finally the tristimulus values in the printer are obtained (S4), the execution sequence of these steps is not limited to the above mentioned sequence. For example, the execution sequence may be S1, S3, S2 and S4 or S3, S1, S2 and S4. That is, the execution sequence is any provided that the step S1 is executed before the execution of the step S2 and the steps S1 to S3 are executed before the execution of the step S4.

Figure 5:
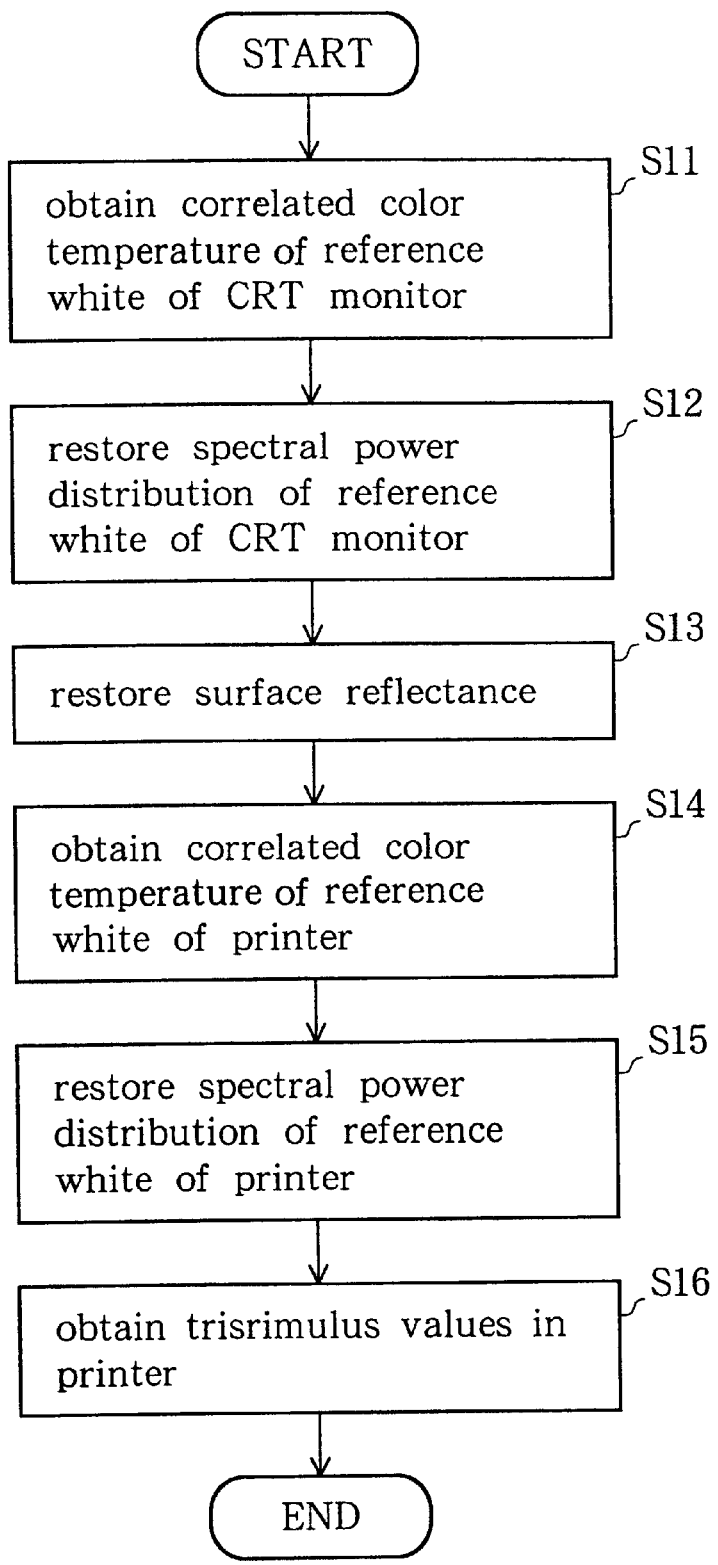
FIG. 5 is a flowchart showing another example of conversion steps of a color conversion method.

Another embodiment of the color conversion method of the present invention will be described with reference to a flowchart shown in FIG. 5. This embodiment is effective when the color temperatures of the reference whites of the CRT monitor and the printer are not given and, in stead thereof, the chromaticity of the reference whites of the CRT monitor and the printer are given.

First, the correlated color temperature of the reference white of the CRT monitor is obtained from the chromaticity of the reference white of the CRT monitor (S11). The correlated color temperature of the reference white of the CRT monitor can be obtained by, for example, the following method. A look-up table representing a relation of correlated color temperatures and chromaticity corresponding to the respective correlated color temperatures is produced from a graph shown in FIG. 6 which shows a relation between the chromaticity and the correlated color temperature. When the chromaticity of the reference white of the CRT monitor is given, the correlated color temperature corresponding to the chromaticity of the input reference white is calculated by an interpolation using the look-up table.

Then, the spectral power distribution of the reference white of the CRT monitor is restored similarly (S12) and, thereafter, the surface reflectance of the object on the CRT monitor is restored (S13).

Thereafter, the correlated color temperature of the reference white of the printer is obtained in the same manner described (S14) and then the spectral power distribution of the reference white of the printer is restored (S15).

Finally, the tristimulus values of the object in the printer is obtained by using the surface reflectance of the object on the CRT monitor, which is obtained in the step S13, the spectral power distribution of the reference white of the printer, which is obtained in the step S15, and the human color matching (S16).

In this embodiment, the execution sequence of the steps S11 to 16 is not limited to the above mentioned sequence and any sequence can be employed provided that the steps S11 and S12 are performed in the sequence before the step S13 is executed, the step S14 is performed before the execution of the step S15 and the steps S11 to 15 are executed before the step S16 is executed.

Figure 7:
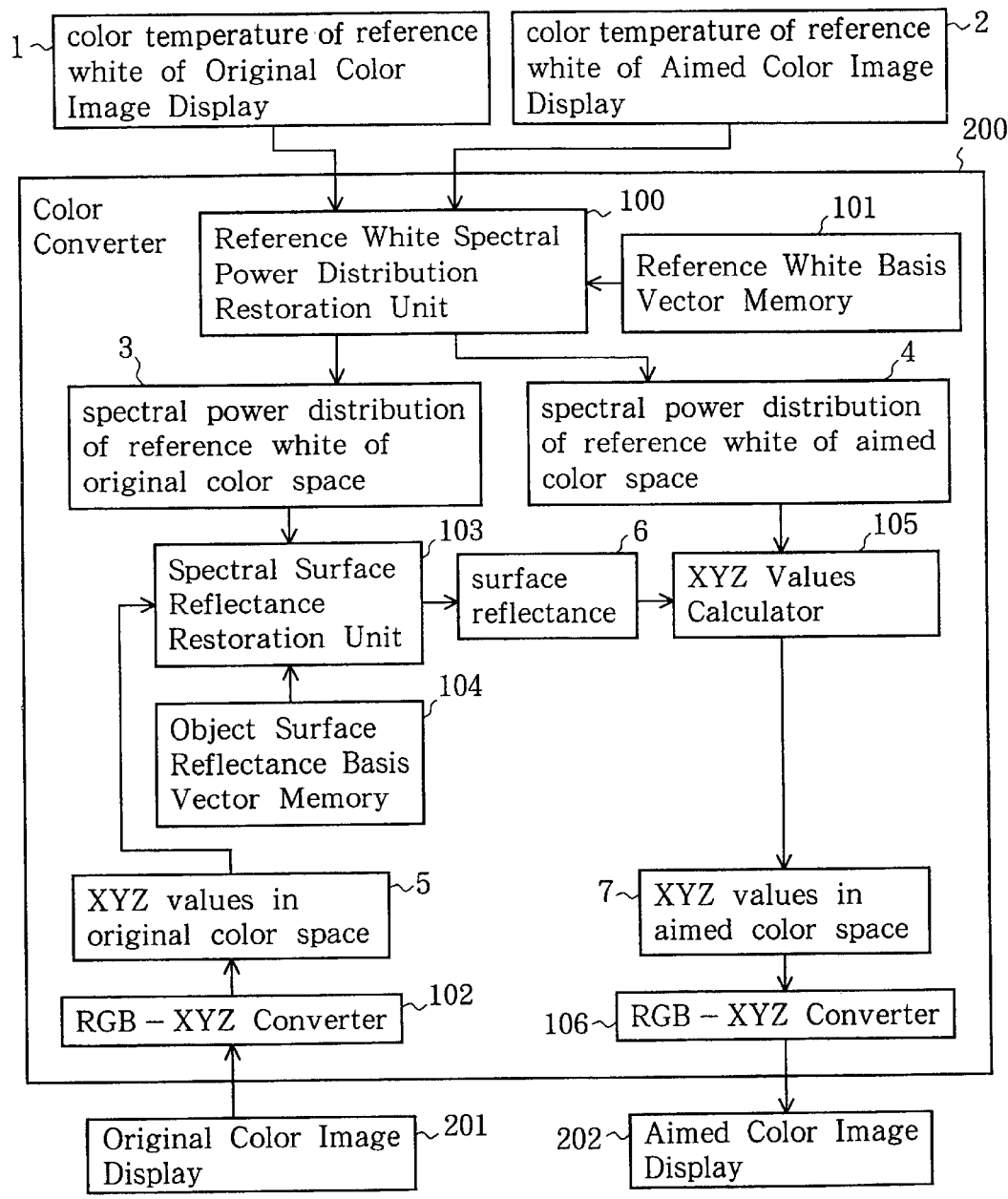
FIG. 7 is a block diagram of an embodiment of a color converter of the present invention.

FIG. 7 is a block diagram showing an embodiment of a color converter according to the present invention.

The color converter 200 is connected to an original color image display 201 whose color characteristics is known and an aimed color image display 202. A color temperature 1 of the reference white of the original color image display 201 and a color temperature 2 of the reference white of the aimed color image display 202 are input to the color converter 200. The original color image display 201 and the aimed color image display 202 reproduce color by RGB values, respectively, and the color converter 200 converts an arbitrary color in the original image display 201 into a color in the aimed color image display 202 such that both colors are the same for human eyes.

The color converter 200 comprises a spectral power distribution restoration unit 100 for restoring a spectral power distribution of reference white, a basis vector memory 101 for storing a basis vector of reference white, an RGB-XYZ converter 102, a spectral surface reflectance restoration unit 103, a basis vector memory 104 for storing a basis vector of a surface reflectance of an object, an XYZ value calculator 105 and an XYZ-RGB converter 106.

An operation of this embodiment will be described.

The color temperature 1 of the reference white of the original color image display 201 is restored to a spectral power distribution 3 of the reference white of the original color space constructed by the original color image display 201 by the reference white spectral power distribution restoration unit 100. The reference white basis vector memory 101 which stores the basis vectors for modeling the reference white spectral power distribution is connected to the reference white spectral power distribution restoration unit 100.

By using the color temperature 1 of the reference white of the original color image display 201 in the equation (4) or (5), the chromaticity $x_p$ of the reference white of the original color image display 201 is obtained and, further, by using the thus obtained chromaticity $x_p$ in the equation (6), the chromaticity $y_p$ is obtained. Then, the coefficients $M_1$ and $M_2$ which are necessary to represent the spectral power distribution with a linearly weighted sum of basis vectors are obtained by using the chromaticity $x_p$ and $y_p$ of the reference white of the original color image display 201 in the equations (8) and (9). Further, the spectral power distribution 3 of the reference white of the original color space corresponding to the color temperature 1 of the reference white of the original color image display 201 is obtained by using the weighted coefficients $M_1$ and $M_2$ in the equation (7). The basis vectors for the reference white utilized in the equation (7) are shown in FIG. 3 and preliminarily stored in the reference white basis vector memory 101.

Thereafter, the reference white spectral power distribution restoration unit 100 restores the spectral power distribution 4 of the reference white of the aimed color space by performing a similar processing to that described previously on the basis of the color temperature 2 of the reference white of the aimed color image display 202.

Arbitrary RGB values in the color space of the original color image display 201 is converted into XYZ values 5 in the original color space constituted by the original color image display 201 by the RGB-XYZ converter 102. Since the color characteristics of the original color image display 201 is known, the conversion from the RGB values into the XYZ values can be performed by a known method.

When the XYZ values 5 in the original color space is input from the RGB-XYZ converter 102 to the spectral surface reflectance restoration unit 103, the latter restores a surface reflectance 6 corresponding to the XYZ values 5 in the original color space, on the basis of the input XYZ values 5, the spectral power distribution 3 of the reference white of the original color space, the basis vectors of the surface reflectance of the object, which is stored in the basis vector memory 104 and the human color matching function.

An operation of the spectral surface reflectance restoration unit 103 will be described in detail.

First, the observation equation (15) for restoring the surface reflectance of the object is made by using the XYZ values 5 of an arbitrary color in the original color space in the left side term $(X_1, Y_1, Z_1)$ of the equation (15) and using the spectral power distribution 3 of the reference white of the original color space, which is restored already, in $S_D(\lambda)$ in the both sides of the equation (15). Incidentally, the color matching functions $x(\lambda)$, $y(\lambda)$ and $z(\lambda)$ are known as shown in FIG. 4. The basis vector $r_1(\lambda)$ representing the surface reflectance of the material can be utilized such that $r_0(\lambda)$ represents an average vector preliminarily obtained by principle component analysis of the surface reflectances of an object having a plurality of colors, $r_1(\lambda)$ represents a first principle component, $r_2(\lambda)$ represents a second principle component and $r_3(\lambda)$ represents a third principle component.

Therefore, the observation equation (15) becomes simultaneous linear equation related to the characteristics parameters $(a_1, a_2, a_3)$ representing the surface reflectance of the object and is solved for the characteristics parameters $(a_1, a_2, a_3)$. By using the thus obtained characteristics parameters $(a_1, a_2, a_3)$ in the equation (14), the surface reflectance 6 corresponding to the input color can be restored.

The XYZ values 7 in the aimed color space is calculated by the XYZ value calculator 105 by using the surface reflectance 6 corresponding to the input color and the spectral power distribution 4 of the reference white of the aimed color space which is already restored. The calculation of the XYZ values is performed by using the spectral power distribution 4 of the reference white of the aimed color space as $S_{D50}(\lambda)$ of the equations (16) to (18) and using the surface reflectance 6 as $R(\lambda)$ of the equations (16) to (18) and integrating them in a visible light region. The integrated $X_2$, $Y_2$, $Z_2$ obtained by this calculation becomes the XYZ values of the aimed color space.

Finally, the XYZ values 7 in the aimed color space is converted into the RGB values of the aimed color image display 202 by the XYZ-RGB converter 106 and the RGB values are output to the aimed color image display 202.

Figure 8:
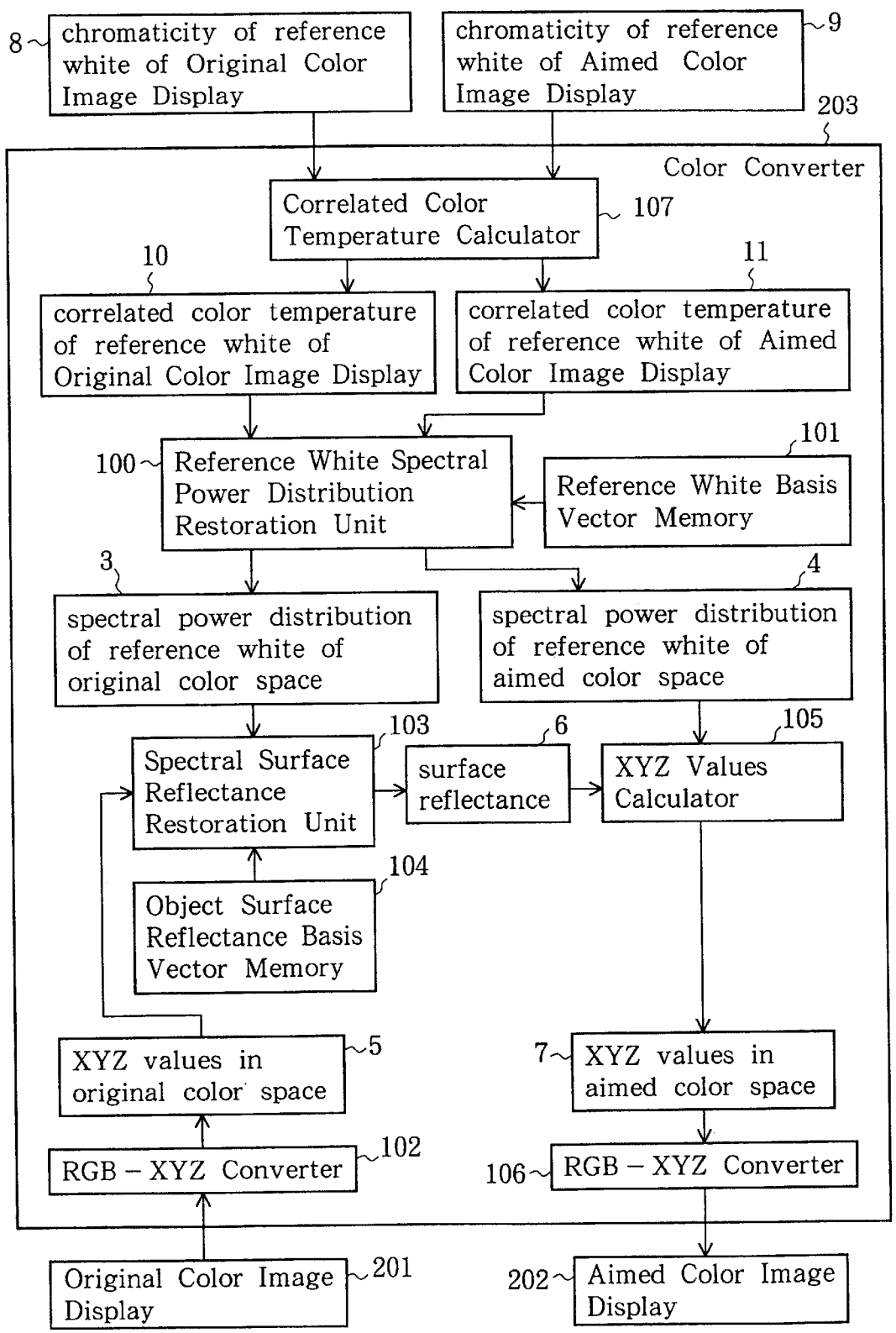
FIG. 8 is a block diagram of another embodiment of a color converter of the present invention.

FIG. 8 is a block diagram of another embodiment of the color converter of the present invention.

In FIG. 8, a color converter 203 is connected to an original color image display 201 whose color characteristics is known and an aimed color image display 202. A chromaticity 8 of the reference white of the original color image display 201 and a chromaticity 9 of the reference white of the aimed color image display 202 are input to the color converter 203. The original color image display 201 and the aimed color image display 202 reproduce color by RGB values, respectively, and the color converter 203 converts an arbitrary color in the original image display 201 into a color in the aimed color image display 202 such that both colors are the same for human eyes.

The color converter 203 comprises, in addition to the components of the color converter 200 shown in FIG. 7, a correlated color temperature calculator 107. In FIG. 8, the same components as those in FIG. 7 are depicted by the same reference numerals as those used in FIG. 7, respectively.

An operation of the embodiment shown in FIG. 8 will be described.

The correlated color temperature calculator 107 calculates correlated color temperatures of the reference whites of the original color image display 201 and the aimed color image display 202 on the basis of the chromaticity 8, 9 of the original and aimed color image displays 201 and 202.

Figure 6:
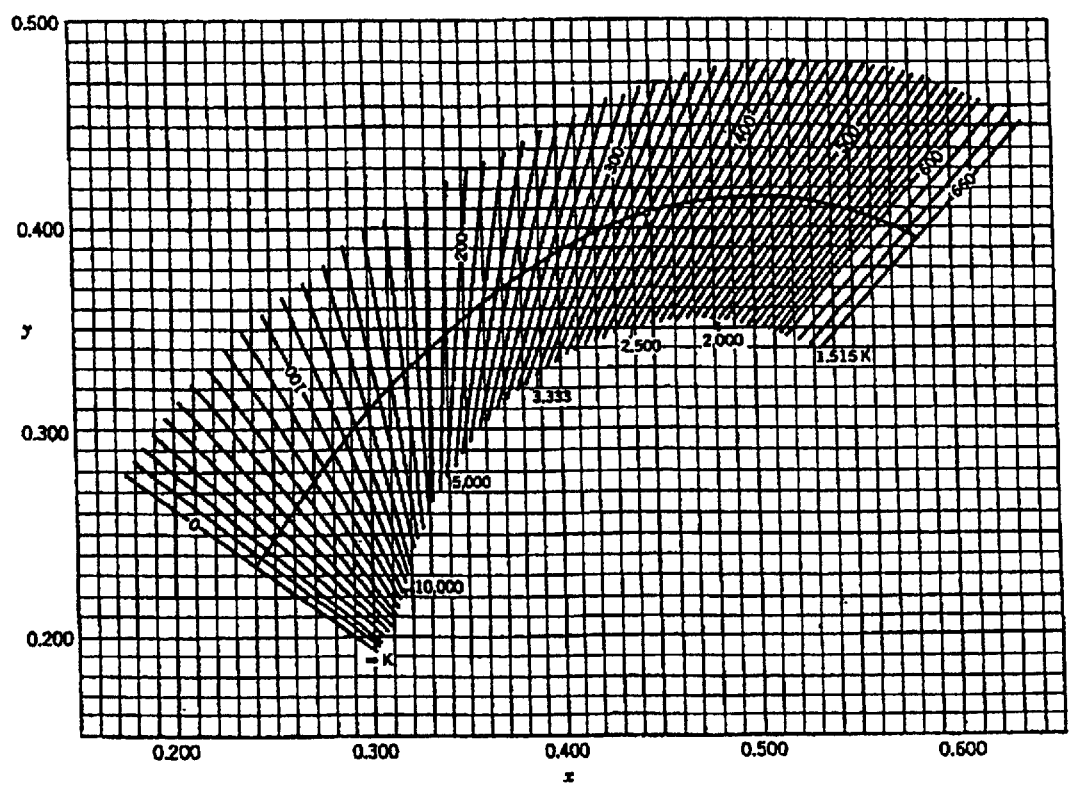
FIG. 6 is a graph showing a relation between correlated color temperature and chromaticity.
Figures 9A, 9B:
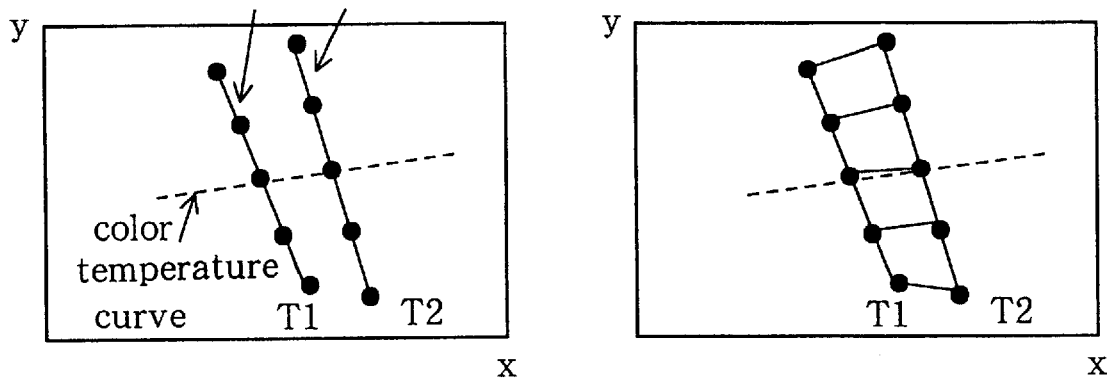
FIGS. 9a and 9b illustrate a method of obtaining correlated color temperature.

Describing the processing performed in the correlated color temperature calculator 107 in detail, N+1 chromaticity points which divide respective line segment representing a portion of a correlated color temperature in the graph shown in FIG. 6, which shows the relation between the correlated color temperature and the chromaticity, to N equal portions are selected as shown in FIG. 9a and tetragonal shapes are produced by connecting N+1 chromaticity points of the line segment of one correlated color temperature curve to corresponding N+1 chromaticity points of the line segment of an adjacent correlated color temperature curve, respectively, as shown in FIG. 9b. The respective tetragonal shapes are arbitrary convex tetragons. Incidentally, the correlated color temperature calculator 107 is provided internally with a memory portion (not shown) storing such relation between the correlated color temperature and the chromaticity as shown in FIG. 6.

Thereafter, one of the tetragons which contains the chromaticity 8 of the reference white of the original color image display 201 is searched. There is always one tetragon which contains the chromaticity 8.

Figure 10:
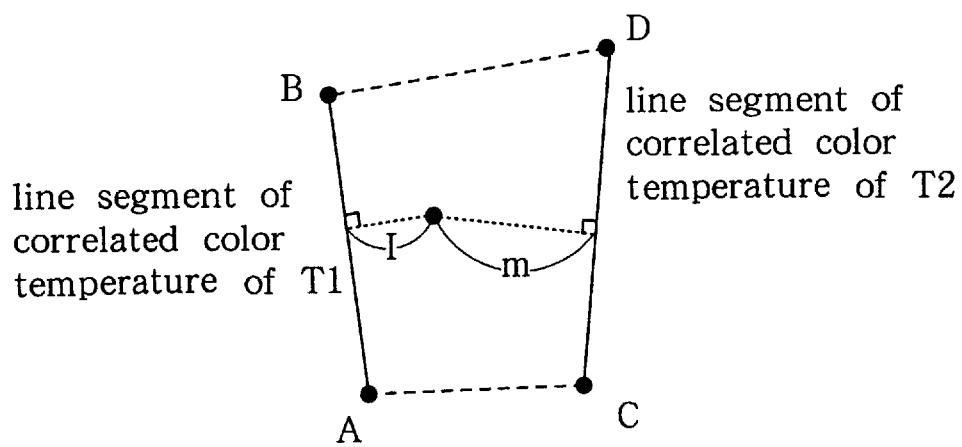
FIG. 10 illustrates a method of obtaining correlated color temperature.

FIG. 10 shows the tetragon which contains the input chromaticity 8 (input color X). Within the tetragon shown in FIG. 10, chromaticity points (A, B) on a straight line of the same correlated color temperature indicate the same correlated color temperature T1 and chromaticity points (C, D) indicate the same correlated color temperature T2.

Then, a distance l between the line segment AB and the input color X and a distance m between the line segment CD and the input color X are calculated. The correlated color temperature T corresponding to the input color X is obtained by interpolation using the distances l and m in the following equation (20). However, the interpolation method is not limited to this method.

$$T = T1 \times m/(l+m) + T2 \times l/(l+m) \qquad (20)$$

After the correlated color temperature calculator 107 obtains the correlated color temperature 10 corresponding to the input chromaticity 8 of the reference white of the original color image display 201, it calculates the correlated color temperature 11 corresponding to the input chromaticity 9 of the reference white of the aimed color image display 202 similarly. In a case where the chromaticity of the reference whites of the original color image display 201 and the aimed color image display 202 are unknown and the tristimulus values of the reference whites of the original color display 201 and the aimed color image display 202 are known, it is enough to obtain the chromaticities of the reference whites of the original color image display 201 and the aimed color image display 202 from the tristimulus values of the reference whites of the original color display 201 and the aimed color image display 202 and input the chromaticities to the color converter 203.

The correlated color temperature 10 of the reference white of the original color image display 201 and the chromaticity 11 of the reference white of the aimed color image display 202, which are calculated by the correlated color temperature calculator 107, are supplied to the spectral power distribution restoration unit 100. The processing subsequent thereto is similar to that performed in the color converter 200 shown in FIG. 7, so that the arbitrary color of the original color image display 201 is converted into a color of the aimed color image display 202, which is output to the aimed color image display 202.

Figure 11:
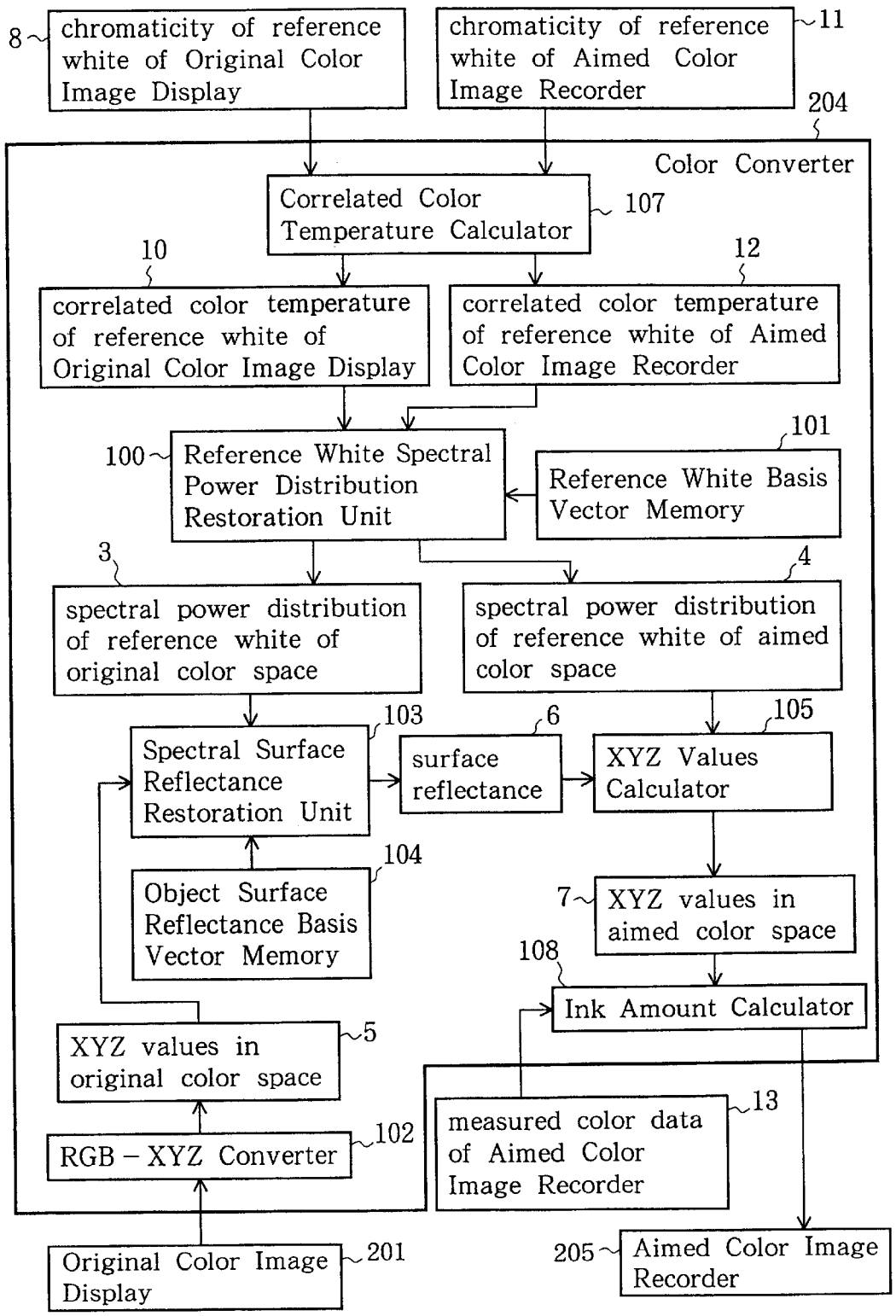
FIG. 11 is a block diagram of a further embodiment of a color converter according to the present invention.

FIG. 11 is a block diagram of a further embodiment of the color converter of the present invention.

In FIG. 11, an original color image display 201 which has a known color characteristics and reproduces color by RGB values and an aimed color image recorder 205 which has a known color characteristics and reproduces color by a plurality of color inks such as cyan, magenta, yellow and black, etc., are connected to a color converter 204. The color converter 204 converts an arbitrary color in the original image display 201 into a color in the aimed color image recorder 205 such that both colors are the same for human eyes and is input with chromaticity 8 of the reference white of the original color image display 201 and chromaticity 11 of the reference white of the aimed color image recorder 205. Further, the color converter 204 is input with a measured color data 13 of the aimed color image recorder 205, which is obtained by measuring a relation between tristimulus values and amounts of the plurality of color inks.

In addition to the components of the color converter 203 shown in FIG. 8, the color converter 204 further comprises an ink amount calculator 108. In FIG. 11, the same components as those in FIG. 8 are depicted by the same reference numerals as those used in FIG. 8, respectively.

The color converter 204 restores the spectral power distribution 3 of the reference white of the original color space corresponding to the chromaticity 8 of the reference white of the original image display 201 and the spectral power distribution 4 corresponding to the chromaticity 11 of the reference white of the aimed color image recorder 205, similarly to the color converter 203 shown in FIG. 8. Further, the color converter 204 calculates XYZ values in the aimed color space constituted by the aimed color image recorder 205 from arbitrary color of the original color image display 201 similarly to the color converter 200 shown in FIG. 7.

When the XYZ values 7 in the aimed color space is calculated, the ink amount calculator 108 converts the XYZ values 7 into the amounts of the respective color inks on the basis of the measured data 13 of the aimed color image recorder 205 and outputs them to the aimed color image recorder 205. The conversion of the tristimulus XYZ values into the amounts of color inks can be performed by using a method described in, for example, Japanese Patent Application Laid-open No. H4-172246 or H6-79088, although other conversion method may be used.

Figure 12:
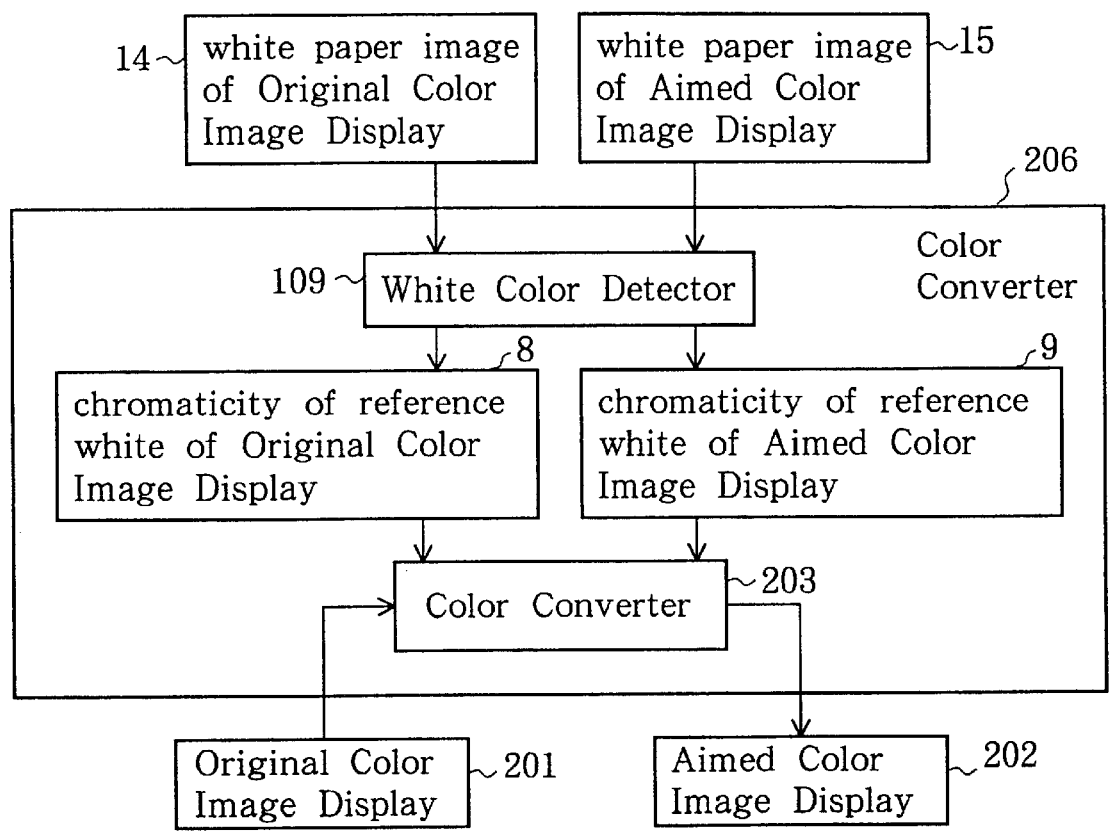
FIG. 12 is a block diagram of a still further embodiment of a color converter according to the present invention.

FIG. 12 is a block diagram of another embodiment of a color converter of the present invention. In FIG. 12, an original color image display 201 and an aimed color image display 202 which have known color characteristics and reproduce colors by RGB values are connected to a color converter 206. The color converter 206 converts an arbitrary color in the original image display 201 into a color in the aimed color image display 202 such that both colors are the same for human eyes and is input with a white paper image 14 of the original color image display 201 and a white paper image 15 of the aimed color image display 202, which are preliminarily prepared by photographing a white paper under an arbitrary illumination.

The color converter 206 comprises the color conversion 203 shown in FIG. 8 and a white color detector 109.

The white color detector 109 detects a white paper portion from the white paper image 14 of the original color image display 201 and obtains RGB values thereof and calculates chromaticity 8 of the reference white of the original color image display 201 on the basis of the RGB values and the color characteristics of the original color image display 201. The white color detector 109 similarly processes the white paper image 15 of the aimed color image display 202 and outputs chromaticity 9 of the reference white of the aimed color image display 202.

The chromaticity 8 of the reference white of the original color image display 201 and chromaticity 9 of the reference white of the aimed color image display 202 are supplied to the color converter 203. The color converter 203 converts an arbitrary color in the original image display 201 into a color in the aimed color image display 202 such that both colors are the same for human eyes, as mentioned previously, and outputs it to the aimed color image display 202.

Figure 13:
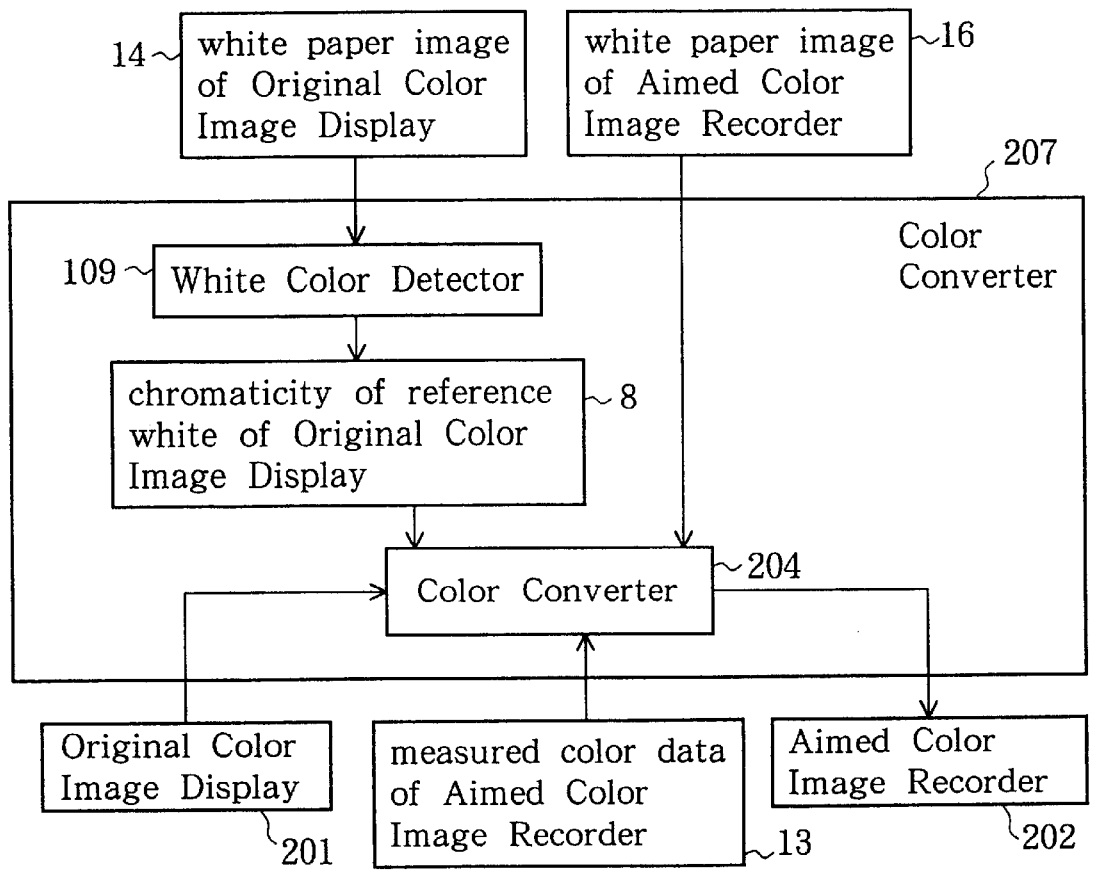
FIG. 13 is a block diagram of a still further embodiment of a color converter according to the present invention.

FIG. 13 is a block diagram of another embodiment of a color converter of the present invention.

In FIG. 13, a color converter 207 is connected to an original color image display 201 which has a known color characteristics and reproduces color by RGB values and an aimed color image recorder 205 which has a known color characteristics and reproduces color by a plurality of color inks such as cyan, magenta, yellow and black, etc. The color converter 207 converts an arbitrary color in the original image display 201 into a color in the aimed color image recorder 205 such that both colors are the same for human eyes and is input with a white paper image 14 of the original color image display 201 and a chromaticity 16 of a white paper image 16 of the aimed color image recorder 205. Further, the color converter 207 is input with a measured color data 13 of the aimed color image recorder 205, which is obtained by measuring a relation between tristimulus XYZ values and amounts of the plurality of color inks.

The color converter 207 comprises the color converter 204 shown in FIG. 11 and a white color detector 109.

The white color detector 109 detects a white paper portion of the white paper image 14 of the original color image display 201 and obtains its RGB values. The white color detector 109 calculates chromaticity 8 of the reference white of the original color image display 201 on the basis of the RGB values and the color characteristics of the original color image display 201.

The chromaticity 8 of the reference white of the original color image display 201 is supplied to the color converter 204. The color converter 204 is supplied with the chromaticity 16 of the white paper of the aimed color image recorder 205. The color converter 204 converts an arbitrary color in the original color image display 201 into amounts of color inks in the aimed color image recorder 205 as in the previously described manner and outputs it to the aimed color image recorder 205.

Figure 14:
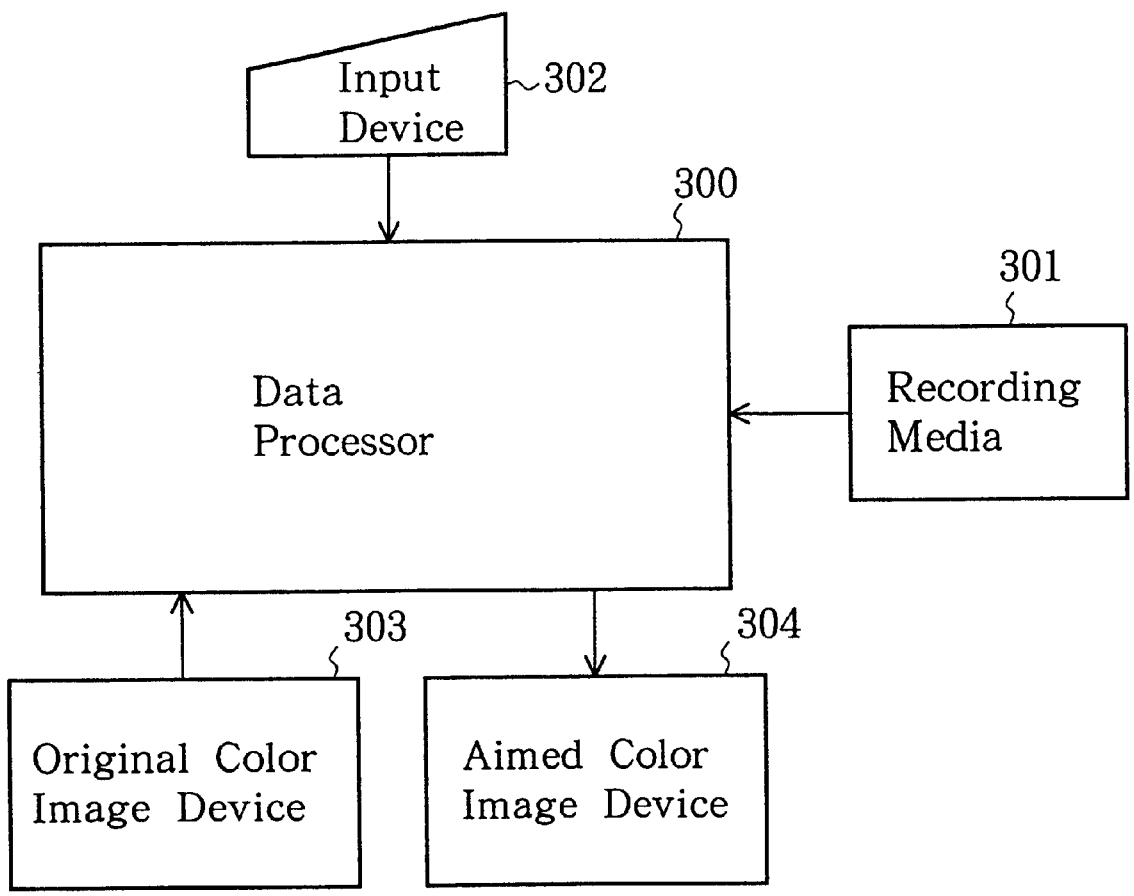
FIG. 14 is a block diagram of a hardware construction realizing the color converter.

FIG. 14 is a block diagram showing a hardware construction realizing the embodiments shown in FIGS. 7, 8, 11, 12 and 13, which comprises a data processor 300 having a recording medium 301 storing a color conversion program, an input device 302, an original color image device 303 and an aimed color image device 304. The recording medium 301 may be a magnetic disk, a semiconductor memory or other recording medium.

When the color converter 200 of the embodiment shown in FIG. 7 is to be realized, the color conversion program recorded in the recording medium 301 is read in by the data processor 300 constituted with a computer and, by controlling an operation of the data processor 300, realizes the spectral power distribution restoration unit 100 for reference white, the basis vector memory 101 for reference white, the RGB-XYZ converter 102, the spectral surface reflectance restoration unit 103, the basis vector memory 104 for surface reflectance of the object, the XYZ value calculator 105 and the XYZ-RGB converter 106 on the data processor 300. Further, the input device 302 is supplied with color temperatures 1 and 2 of the reference whites of the original and aimed color image displays and the original color image device 303 and the aimed color image device 304 operate as the original color image display 201 and the aimed color image display 202, respectively.

When the color converter 203 of the embodiment shown in FIG. 8 is to be realized, the color conversion program recorded in the recording medium 301 is read in by the data processor 300 constituted with a computer and, by controlling an operation of the data processor 300, realizes the spectral power distribution restoration unit 100 for reference white, the basis vector memory 101 for reference white, the RGB-XYZ converter 102, the spectral surface reflectance restoration unit 103, the basis vector memory 104 for surface reflectance of the object, the XYZ value calculator 105, the XYZ-RGB converter 106 and the correlated color temperature calculator 107 on the data processor 300. Further, the input device 302 is supplied with color temperatures 1 and 2 of the reference whites of the original and aimed color image displays and the original color image device 303 and the aimed color image device 304 operate as the original color image display 201 and the aimed color image display 202, respectively.

When the color converter 203 of the embodiment shown in FIG. 11 is to be realized, the color conversion program recorded in the recording medium 301 is read in by the data processor 300 constituted with a computer and, by controlling an operation of the data processor 300, realizes the spectral power distribution restoration unit 100 for reference white, the basis vector memory 101 for reference white, the RGB-XYZ converter 102, the spectral surface reflectance restoration unit 103, the basis vector memory 104 for surface reflectance of the object, the XYZ value calculator 105, the correlated color temperature calculator 107 and the ink amount calculator 108 on the data processor 300. Further, the input device 302 is supplied with chromaticity 8 of the reference white of the original color image display and chromaticity 11 of the aimed color image recording device and the measured color data 13 of the aimed color image recording device and the original color image device 303 and the aimed color image device 304 operate as the original color image display 201 and the aimed color image recorder 205, respectively.

When the color converter 206 of the embodiment shown in FIG. 12 is to be realized, the color conversion program recorded in the recording medium 301 is read in by the data processor 300 constituted with a computer and, by controlling an operation of the data processor 300, realizes the spectral power distribution restoration unit 100 for reference white, the basis vector memory 101 for reference white, the RGB-XYZ converter 102, the spectral surface reflectance restoration unit 103, the basis vector memory 104 for surface reflectance of the object, the XYZ value calculator 105, the XYZ-RGB converter 106, the correlated color temperature calculator 107 and the white color detector 109 on the data processor 300. Further, the input device 302 is supplied with the white paper images 14 and 15 of the original color image display and the aimed color image recording device and the original color image device 303 and the aimed color image device 304 operate as the original color image display 201 and the aimed color image recorder 205, respectively.

When the color converter of the embodiment shown in FIG. 13 is to be realized, the color conversion program recorded in the recording medium 301 is read in by the data processor 300 constituted with a computer and, by controlling an operation of the data processor 300, realizes the spectral power distribution restoration unit 100 for reference white, the basis vector memory 101 for reference white, the RGB-XYZ converter 102, the spectral surface reflectance restoration unit 103, the basis vector memory 104 for surface reflectance of the object, the XYZ value calculator 105, the correlated color temperature calculator 107, the ink amount calculator 108 and the white color detector 109 on the data processor 300. Further, the input device 302 is supplied with the white paper image 14, chromaticity 16 of the white paper of the aimed color image recording device and the measured color data 13 of the aimed color image recording device and the original color image device 303 and the aimed color image device 304 operate as the original color image display 201 and the aimed color image recorder 205, respectively.

As described hereinbefore, the present invention restores a surface reflectance of an arbitrary color in an original color space and performs a color conversion by utilizing the restored surface reflectance. Therefore, even in a situation in which color temperatures of reference whites of color image devices such as a CRT monitor and a printer are substantially different, it is possible to make colors in the color image devices having different color temperatures of the reference whites coincident without necessity of constraint of special observing condition influencing human color adaptation and with minimum amount of calculation.

Further, according to the present invention, it is possible to perform a color conversion so long as chromaticity of reference whites in an original and an aimed color spaces are known even if the color temperatures of the reference whites of the original color space and the aimed color space are unknown.

What is claimed is:

1. A color conversion method for converting an arbitrary color in an original color space into a color in an aimed color space while maintaining these color appearances the same, comprising the steps of:

restoring a spectral power distribution of an original reference white of the original color space from a color temperature of the original reference white, restoring a spectral power distribution of the aimed reference white from a color temperature of an aimed reference white of the aimed color space and restoring a surface reflectance of an arbitrary color in the original color space by utilizing tristimulus values of the arbitrary color in the original color space, the spectral power distribution of the original reference white and a human color matching function; and obtaining tristimulus values of the color in the aimed color space from the restored surface reflectance, the restored spectral power distribution of the aimed reference white and the human color matching function.

2. A color conversion method for converting an arbitrary color in an original color space into a color in an aimed color space while maintaining these color appearances the same, comprising the steps of:

obtaining a correlated color temperature of an original reference white from tri-stimulus value of the original color space, restoring a spectral power distribution of the original reference white from the thus obtained correlated color temperature, obtaining a correlated color temperature of the aimed reference white of the aimed color space from the tri-stimulus value of the aimed reference white, restoring a spectral power distribution of the aimed reference white from the thus obtained correlated color temperature, restoring a surface reflectance of an arbitrary color in the original color space by utilizing tristimulus values of the arbitrary color, the spectral power distribution of the original reference white and a human color matching function; and obtaining tristimulus values of the color in the aimed color space from the restored surface reflectance, the restored spectral power distribution of the aimed reference white and the human color matching function.

3. A color conversion method as claimed in claim 2, wherein, in obtaining the correlated color temperature from the chromaticity of the original reference white and in obtaining the correlated color temperature from the chromaticity of the aimed reference white, the correlated color temperature is obtained by an interpolation using a look-up table showing a relation between correlated color temperature and chromaticity.

4. A color conversion method as claimed in claim 2 or 3, wherein, in obtaining the correlated color temperature from the chromaticity of the original reference white and in obtaining the correlated color temperature from the chromaticity of the aimed reference white, a chromaticity of a white paper in the original color space instead of the chromaticity of the original reference white is used and a chromaticity of a white paper in the aimed color space instead of the chromaticity of the aimed reference white.

5. A color converter for displaying an arbitrary RGB data displayed on an original color image display for performing a color reproduction by means of RGB lights on an aimed color image display performing a color reproduction by means of RGB lights while maintaining these color appearances the same, comprising:

spectral power distribution restoring means for restoring a spectral power distribution of a reference white of said original color image display from a color temperature of the reference white of said original color image display and restoring a spectral power distribution of a reference white of said aimed color image display from a color temperature of a reference white of said aimed color image display;

spectral surface reflectance restoring means for restoring a surface reflectance in a scene of the arbitrary RGB values displayed on said original color image display on the basis of the restored spectral power distribution of the reference white of said original color image display, the RGB values and the human color matching function; and RGB value calculation means for calculating RGB values in said aimed color image display from the surface reflectance restored by said spectral surface reflectance restoring means, the spectral power distribution of the reference white of said aimed color image display restored by said spectral power distribution restoring means and the human color matching function.

6. A color converter for displaying an arbitrary RGB data displayed on an original color image display for performing a color reproduction by means of RGB lights on an aimed color image display performing a color reproduction by means of RGB lights while maintaining these color appearances the same, comprising:

correlated color temperature calculation means for calculating correlated color temperature of a reference white of said original color image display from chromaticity of the reference white of said original color image display and calculating correlated color temperature of a reference white of said aimed color image display from chromaticity of the reference white of said aimed color image display;

spectral power distribution restoring means for restoring a spectral power distribution of the reference white of said original color image display from a correlated color temperature of the reference white of said original color image display calculated by said correlated color temperature calculation means and restoring a spectral power distribution of the reference white of said aimed color image display from the correlated color temperature of the reference white of said aimed color image display calculated by said correlated color temperature calculation means;

spectral surface reflectance restoring means for restoring a surface reflectance in a scene of the arbitrary RGB values displayed on said original color image display on the basis of the spectral power distribution of the reference white of said original color image display restored by said spectral power distribution restoration means, the arbitrary RGB values displayed on said original color image display and the human color matching function; and RGB value calculation means for calculating RGB values in said aimed color image display from the surface reflectance restored by said spectral surface reflectance restoring means, the spectral power distribution of the reference white of said aimed color image display restored by said spectral power distribution restoring means and the human color matching function.

7. A color convener as claimed in claim 6, wherein said spectral power distribution restoring means comprises a memory portion for storing a relation between correlated color temperature and chromaticity and means for obtaining a correlated color temperature corresponding to a chromaticity input by an interpolation using said memory portion.

8. A color converter as claimed in any of claims 5, 6 and 7, wherein a color image recording device for reproducing color by a plurality of color inks is provided instead of said aimed color image display.

9. A color converter as claimed in claim 6 or 7, further comprising white color detection means for detecting chromaticity corresponding to white papers in scenes in said original color image display and said aimed color image display on the basis of white paper images of said original color image display and said aimed color image display; and wherein said correlated color temperature calculation means comprising means for calculating the correlated color temperatures of the reference whites of said original color image display and said aimed color image display from the chromaticity detected by said white color detection means instead of the chromaticity of said original color image display and said aimed color image display.

10. A color converter as claimed in claim 8, further comprising white color detection means for detecting chromaticity corresponding to a white paper in a scene in said original color display on the basis of the white paper image of said original color image display, wherein said correlated color temperature calculation means comprises means for calculating the correlated color temperatures of the reference whites of said original color image display by using the chromaticity detected by said white color detection means instead of the chromaticity of the reference white of said original color image display and calculating he correlated color temperatures of the reference whites of said aimed color image recording chromaticity of white paper for said aimed image recording device.

11. A machine readable recording medium storing a computer program for functioning a computer as:

spectral power distribution restoration means for restoring a spectral power distribution of a reference white of an original color image display from a color temperature of the reference white of said original color image display and restoring a spectral power distribution of a reference white of an aimed color image display from the color temperature of the reference white of said aimed color image display;

spectral surface reflectance restoring means for restoring a surface reflectance in a scene of arbitrary RGB values displayed on said original color image display on the basis of the spectral power distribution of the reference white of said original color image display restored by said spectral power distribution restoring means, the arbitrary RGB values and the human color matching function; and RGB value calculation means for calculating the RGB values in said aimed color image display from the surface reflectance restored by the spectral surface reflectance restoring means, the spectral power distribution of the reference white of said aimed color image display restored by said spectral power distribution restoring means and the human color matching function.

12. A machine readable recording medium storing a computer program for functioning a computer as:

correlated color temperature calculation means for calculating a correlated color temperature of the reference white of the original color image display from chromaticity of the reference white of the original color image display and a correlated color temperature of the reference white of the aimed color image display from chromaticity of the reference white of the aimed color image display;

spectral power distribution restoration means for restoring a spectral power distribution of a reference white of an original color image display from a color temperature of the reference white of said original color image display and restoring a spectral power distribution of a reference white of an aimed color image display from the color temperature of the reference white of said aimed color image display;

spectral surface reflectance restoring means for restoring a surface reflectance in a scene of arbitrary RGB values displayed on said original color image display on the basis of the spectral power distribution of the reference white of said original color image display restored by said spectral power distribution restoring means, the arbitrary RGB values and the human color matching function; and RGB value calculation means for calculating the RGB values in said aimed color image display from the surface reflectance restored by the spectral surface reflectance restoring means, the spectral power distribution of the reference white of said aimed color image display restored by said spectral power distribution restoring means and the human color matching function.

* * * * *